United States Patent [19]

White

[11] 4,425,445

[45] Jan. 10, 1984

[54] METHOD FOR THE MANUFACTURE OF POLYISOCYANURATE FOAMS

[75] Inventor: Kenneth B. White, Chicago, Ill.

[73] Assignee: Akzona, Inc., Asheville, N.C.

[21] Appl. No.: 476,183

[22] Filed: Mar. 17, 1983

[51] Int. Cl.$^3$ ............................................. C08G 18/14
[52] U.S. Cl. ...................................... 521/105; 521/167
[58] Field of Search ................................ 521/105, 167

[56] References Cited

U.S. PATENT DOCUMENTS

| | | | |
|---|---|---|---|
| 4,040,992 | 8/1977 | Bechara et al. | 521/117 |
| 4,151,334 | 4/1979 | Kan et al. | 521/105 |
| 4,186,255 | 1/1980 | Klein et al. | 521/128 |
| 4,256,802 | 3/1981 | Koehler et al. | 521/118 |

Primary Examiner—Maurice J. Welsh
Attorney, Agent, or Firm—Francis W. Young; Daniel N. Christus

[57] ABSTRACT

A method for the manufacture of polyisocyanurate foams which comprises blending a "B" side with an "A" side comprising an isocyanate. The "B" side comprises a diol, an amine/quaternary ammonium borate ester blend, a surfactant, a blowing agent, and a metal catalyst whose weight does not exceed 1.5% of the total weight of the "B" side. The "B" side remains a homogeneous liquid for at least seven days without the need for agitation and the foam formed by this method has a friability not exceeding 30%.

7 Claims, No Drawings

METHOD FOR THE MANUFACTURE OF POLYISOCYANURATE FOAMS

BACKGROUND OF THE INVENTION

This invention relates to the manufacture of polyisocyanurate foams, and is more particularly concerned with a method for the manufacture of foams that utilizes a very small amount of a metal catalyst and also uses an amine/quaternary ammonium borate ester blend as a polyol. Methods of manufacturing polyisocyanurate foams are well known in the art, and include the method described in U.S. Pat. No. 4,256,802, issued to Koehler et al on Mar. 17, 1981 (hereinafter referred to as "Koehler"). Koehler discloses polyol blends comprising from about 20% to about 85% by weight of the blend of an amine diol or mixture of amine diols selected from the formula:

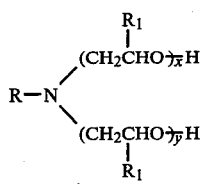

wherein R is an aliphatic radical having from 8 to 18 carbon atoms, inclusive, each $R_1$ is independently selected from the group consisting of hydrogen or methyl, x and y each independently have an average value from about 4 to about 15 inclusive; and from about 15 percent to about 80 percent by weight of a primary hydroxyl polyol (II) characterized by a molecular weight of from about 60 to about 1000. Koehler asserts that the polyol blends described therein are miscible with fluorocarbon blowing agents and water and other adjuvants including trimerization catalysts, and that its blends are particularly useful in a process for the preparation of polyisocyanurate foams. Those foams are said to be characterized by high reaction exotherms, making them particularly suited to the preparation of polyisocyanurate foam laminates.

It is noted that the Koehler process for foam manufacture, in which the "B" side utilizes a fluorocarbon blowing agent and a polyol, and also requires a trimerization catalyst in an amount of from 2 to 20 percent by combined weight of the catalyst, fluorocarbon blowing agent, and polyol. Trimerization catalysts disclosed in Koehler include (1) a catalyst combination of alkali metal salts of an N-substituted amide, an alkali metal salt of an N-(2-hydroxyphenyl)methyl glycine and optionally a tertiary amine trimerization catalyst, and (2) the same catalyst as described hereinabove except the optional component is a hydroxyalkyltrialkylammonium carboxylate salt.

Certain quaternary ammonium carboxylate salts and even quaternary boron salts have been disclosed as trimerization catalysts in several prior art references (see U.S. Pat. Nos. 4,040,992, 4,186,255 and 4,151,334). These quaternary borate salts disclosed are compounds such as, for example, sodium phenyl triethanolamineborates, which all have sodium as the cationic portion of the molecule. Thus, all of these quaternary borate salts are alkali metal salts (see U.S. Pat. No. 4,151,334, column 2, lines 6-7), compounds that were previously known as trimerization catalysts.

SUMMARY OF THE INVENTION

The present invention is a method for the manufacture of polyisocyanurate foams, comprising blending a "B" side with an "A" side, the "A" side comprising an isocyanate. The "B" side comprises a diol, an amine/quaternary ammonium borate ester blend, a surfactant, a blowing agent, and a metal catalyst, the weight of the metal catalyst not to exceed 1.5% of the total weight of the "B" side. The "B" side remains a homogeneous liquid for at least seven days without the need for agitation, and the foams manufactured in the method of the invention have a friability not exceeding 30%. In another embodiment of the invention the diol may be selected from the group consisting of diethylene glycol, dipropylene glycol, and a polyethylene glycol ether. In yet another embodiment of the invention the ratio of amine to quaternary ammonium borate ester in the amine/quaternary ammonium borate ester blend is between 1:0.15 and 1:0.90. In still another embodiment of the invention, the isocyanate is a polymeric methylene diphenyldiisocyanate.

An object of the present invention is thus a method of manufacturing polyisocyanurate foams with a polyol that permits the amount of trimerization catalyst used to be significantly less than the amount of trimerization catalyst used in previous methods for the manufacture of such foams.

DESCRIPTION OF THE PREFERRED EMBODIMENTS

The isocyanates used in the "A" side herein may be selected from the groups including the organic polyisocyanates which are disclosed and known in the art as useful in the production of conventionally manufactured polyisocyanurate foams. The preferred polyisocyanate is Mondur ® MR, a polycyclic aromatic polyisocyanate available from the Mobay Chemical Corporation, Pittsburgh, Pa.

The present polyisocyanurate foams may be manufactured according to methods known in the art. These methods comprise blending two components, stirring, and allowing the component mix to rise in an open container so as to form the desired foam. The two components are known as the "A" and "B" components, with the "A" component comprising the polyisocyanate and the "B" component comprising a blend of polyol, catalyst, surfactant and blowing agent.

Catalysts may be selected from those conventionally used in the art, including metal salts, alkali metal salts, and tertiary amine trimerization catalysts. The preferred catalyst is potassium octonoate or potassium 2-ethylhexanoate. The present preferred catalyst is M & T—T45 catalyst, which is 45% active potassium 2-ethylhexanoate and 55% polyethylene glycol having a molecular weight of 200, and which is available from M & T Chemicals Inc., Rahway, N.J., 07065. The weight of the catalyst to be used will be less than 1.5% of the total "B" side weight, and most preferably less than 1.0% of the total "B" side weight.

The blowing agent may be selected from the group including water, methylene chloride, or any of the fluorocarbons known to those skilled in the art which can be used for blowing polymer mixtures into cellular polymers. Generally speaking, such flurocarbon blowing agnets are fluorinated aliphatic hydrocarbons which may also be substituted by chlorine and/or bromine. A most preferred blowing agent is Freon ® 11A, a trifluorochloromethane produced by E. I. DuPont de Nemours & Company, Wilmington, Del.

Surfactants may likewise be chosen from among those known to the skilled in the art; a preferred surfactant is DC-193, a surfactant having silicon glycol copolymers with a direct silicon-carbon bond, and sold by the Dow Corning Corporation, Midland, Mich.

Preferred diols will be selected from the group including diethylene glycol, dipropylene glycol, and polyester and polyethylene glycols, such as PEG 200. Polyethylene glycol ethers include those compounds of the general formula:

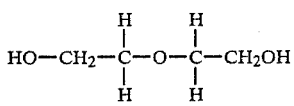

Polyethylene glycols will include those compounds having longer carbon chains on either side of the oxygen atom. The general formula for the polyethylene glycols is:

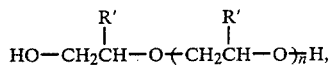

wherein $R'$ is either a hydrogen or methyl ($CH_3$—) radical and wherein n may be between 0 and 10.

The amine/quaternary ammonium borate ester ratio in the amine/quaternary ammonium borate ester blend is between 1:0.15 and 1:0.90. This range of ratios is the range of ratios of amine to quaternary ammonium borate ester in the Armol TM 200 series, that is Armol TM 201B-125, 135, 145, 155, and 175. These compounds are available from the Armak Company, 300 S. Wacker Drive, Chicago, Ill. 60606, or can be manufactured in accordance with the procedures set forth in Examples 1 and 2 hereinbelow.

The isocyanates may be selected from the groups including the organic polyisocyanates which are disclosed herein as useful in the production of conventionally manufactured polyisocyanurate foams. A preferred polyisocyanate is Mondur ® MR, a polycyclic aromatic polyisocyanate available from the Mobay Chemical Corporation, Pittsburgh, Pa.

The molar ratio of isocyanate to polyol, that is, the ratio of NCO functional groups to OH functional groups, is known as the "index" or "NCO/OH ratio". Foams are manufactured with both isocyanates and polyols, and when the molar ratio of isocyanate to polyol is between 1.05 to 1.15, an urethane foam is formed according to the reaction:

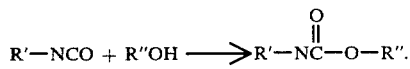

The urethane product shown above is the monomeric structural unit that combines to form the polyurethane foam. At an index between 1.5 and 3.5, a urethane-modified isocyanurate foam is formed. At indices above 4.1, a isocyanurate foam is formed, having as its monomeric unit the product of the reaction:

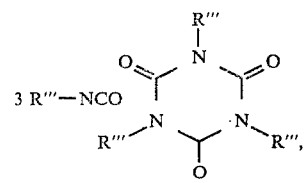

which may have a minority of urethane linkages. Herein, the terms isocyanurate and polyisocyanurate and the terms urethane and polyurethane in reference to foams will be used interchangably.

The present claims are directed to polyisocyanurate foams, and the NCO/OH index of the blends used to make these foams will always exceed 4.0. Typical polyisocyanurate foams manufactured in accordance with the process herein have an NCO/OH ratio of 4.4. A good foam will have as a "B" side a blend that remains homogeneous when left in a closed container for seven days, and such a foam will further have a friability less than 30%. Friability will be determined in accordance with the American Society for Testing Materials (ASTM) Test C421.

The amines used in the present amine/quaternary ammonium borate ester blend may include polyethoxylated or polypropoxylated amines, wherein the amines are tertiary amines having one fatty alkyl group derived from various fatty sources and two or more polyoxyethylene or polyoxypropylene groups attached to the nitrogen. Typical of these polyethoxylated or polypropoxylated amines are the Ethomeen ® polyethoxylated amines available from the Armak Company, 300 S. Wacker Drive, Chicago, Ill., 60606, preferably being of the general formula:

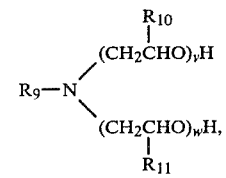

wherein $R_9$ is selected from the group of alkyl radicals having between 1 and 18 carbon atoms, v and w are integers each having a value of one or more, the sum of v and w not exceeding 50; and wherein $R_{10}$ and $R_{11}$ may be the same or different, and may be selected from the groups consisting of H—, $CH_3$—, $C_1$–$C_{10}$ straight- or branched-chain alkyl or alkenyl radicals, a phenyl group, a benzyl group or halogenated alkyl group. Another preferred polyalkoxylated amine includes the compound Ethomeen ® EA-80 polyethoxylated ether amine, which is manufactured by the combination of a $C_8$ and $C_{10}$ branched-chain alcohol and which is also available from the Armak Company, Chicago, Ill. These preferred ether amines are selected from the group consisting of:

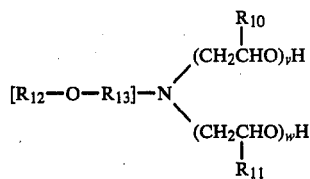

wherein $R_{12}$ is selected from the group of $C_1$–$C_{20}$ alkyl groups, and $R_{13}$ is a $C_2$ to $C_5$ alkyl group; $R_{10}$ and $R_{11}$ are the same or different and may be selected from the groups consisting of H—, $CH_3$—, $C_1$ to $C_{10}$ straight- or branched-chain alkyl or alkenyl radicals, a phenyl group, a benzyl group, or a halogenated alkyl group; and v and w are integers each having a value of at least 1 and having a sum not exceeding 50.

The quaternary ammonium borate esters are of the general formula:

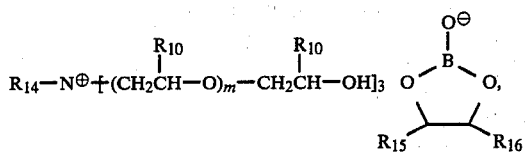

wherein $R_{14}$ is a straight- or branched-chain alkyl or alkenyl radical having from 1 to 30 carbon atoms, inclusive, or a phenyl or benzyl radical; $R_{10}$ is H—, a $C_1$ to $C_{10}$ straight- or branched-chain alkyl or alkenyl radical, a phenyl group, a benzyl group, or a halogenated alkyl group; $R_{15}$ and $R_{16}$ are different or the same and are selected from the group including H—, or a $C_1$ to $C_{10}$ straight- or branched-chain alkyl or alkenyl radical, a phenyl group, or a benzyl group, and wherein m is an integer between 0 and 30, inclusive. The cationic portion of the polyalkoxylated quaternary ammonium borate ester may also be selected from the group described by the general formula:

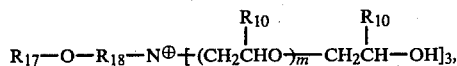

wherein m and $R_{10}$ are as defined hereinabove, $R_{17}$ is a $C_1$–$C_{20}$ alkyl or alkoxy group, and $R_{18}$ is a $C_2$ to $C_5$ alkyl group. Preferably, $R_{18}$ is —$C_3H_6$— and $R_{17}$ is a combination of approximately equal amounts of $C_{12}$–$C_{15}$ alkyl groups. In this specification, the cationic portion of the polyalkoxylated quaternary ammonium borate esters may be selected from either of the above two general formulae. The weight ratio of the polyalkoxylated amine to the polyalkoxylated quaternary ammonium borate ester is between 1:0.15 and 1:0.90.

The preferred diol is diethylene glycol, but some of the other suitable diols include dipropylene glycol and a polyethylene glycol ether.

The following Examples 1 and 2 will demonstrate the manufacture of the amine/quaternary ammonium borate ester blend used in the present invention. Examples 3-6 will demonstrate the manufacture of foams in accordance with the present process.

EXAMPLE 1

304 grams of 1,2-propanediol (4.0 gram moles) are added to 124 grams of boric acid (2.0 gram moles) in a one-liter, three neck flask equipped with a heating mantle, a Dean-Stark trap, and a condenser. The mixture is heated to 128° C. at atmospheric pressure, and retained at that temperature and pressure for about 3½ hours, during which time about 44.5 grams of water was stripped from the mixture. A water aspirator is then started to create a slight vacuum at the condenser, and another 65.0 grams of water is stripped from the mixture during the next 5¾ hours. The total water removed (109.5 grams) corresponds to the stoichiometric amount, but analysis of the borate ester adduct remaining in the flask showed that it contained 3.4% water.

A 100 gallon Monel reactor was charged with 186 lbs. (0.71 lb. mole) of Armeen ® TM 97 aliphatic amine and 30.0 lbs. of diethylene glycol, and the mixture was heated to 65° C. Over a two hour period, 85 lbs. (0.53 lb. mole) of the bis propylene glycol ester described in the first paragraph of this Example was pumped into the reactor, causing the temperature to rise to 80° C. After cooling to 75° C., 133 lbs. (3.02 lb. mole) of ethylene oxide was added over a period of two hours and 42 minutes. During this time the total reactor pressure was not allowed to exceed 50 psig and the temperature was maintained at 95° C. The mixture was allowed to digest for another 2 hours and 40 minutes, whereupon analysis showed 1.317 meg/g of quat and 0.307 meg/g of free amine and 0.3% $H_2O$. The reactor was purged with a stream of nitrogen at 75°–85° C. and 0 psig pressure for 4 hours and an additional 6 hours at 100° C. Analysis of this adduct showed 0.11% $H_2O$.

27.9 lbs. of the adduct and 107.1 lbs. Ethomeen ® T/15, also available from the Armak Company, were mixed in a 30 gallon Pfaudler reactor at 70° C. Water was removed from the blend by sparging with a stream of nitrogen at 70° C. and 27″ Hg vacuum over a 5½ hour period. Analysis after this time showed; quat 0.238 meg/g, free amines 1.779 meg/g, pH (10% in $H_2O$) 10.9, $H_2O$ < 0.1% and OH value 318. This product corresponds to Armol TM 201B-125 amine/ammonium borate ester blend.

EXAMPLE 2

39.0 lbs. of the adduct whose manufacture is described in the first three paragraphs of Example 1 hereinabove and 96.0 lbs. of Ethomeen ® T/15 ethoxylated amine were blended at 70° C. in a 30 gallon Pfaudler reactor. Water was removed by sparging with a stream of nitrogen at 70° C. and 27″ Hg vacuum over 5 hours. Analysis showed; quat 0.331 mag/g, free amine 1.650 meg/g, pH (10% in water) 10.9, $H_2O$ < 0.1%, OH value 332. This product corresponds to Armol TM 201B-135 amine/ammonium borate ester blend.

Armol TM 210B-145, Armol TM 201B-155 and Armol TM 201B-175 amine/ammonium borate ester blends are manufactured in the manner described above using a ratio of the aforesaid adduct to Ethomeen ® T/15 of 4.8:8.2, 5.9:7.1, and 9.3:5.7, respectively.

EXAMPLE 3

A polyisocyanurate foam was manufactured by blending 194.7 grams of Modur ® MR with a "B" side comprising 13.4 grams of diethylene glycol, 13 grams of Armol TM 210B-125, 2.5 grams of DC-193, 0.2 grams of T-45 catalyst, and 34 grams of Freon ® 11A to give a blend having an NCO/OH ratio of 4.4 The resulting foam had a cream time of 23 seconds, a gel time of 34 seconds, a tack free time of 48 seconds, a density of 1.90 pounds per cubic feet, 97.25% closed cells, and a friability of 5.9%. The resulting foam was at 104.2% of its original dimensions after seven days at 158° F. and 100% relative humidity, and was at 102.4% of its original dimensions after seven days at 200° F. and the ambient relative humidity. The "B" side, when placed in a closed container, remained a homogeneous liquid when left to stand without agitation for seven days.

EXAMPLE 4

A polyisocyanurate foam was manufactured by blending 196.6 grams of Mondur ® MR with a "B" side comprising 13 grams of Armol ™ 201B-135, 13.4 grams of diethylene glycol, 2.5 grams of DC-193, 0.2 grams of T-45 catalyst, and 34 grams of Freon ® 11A to give a blend having an NCO/OH ratio of 4.4. The resulting foam had a cream time of 23 seconds, a gel time of 34 seconds, a rise time of 46 seconds, a density of 2.01 pounds per cubic feet, 98.62% closed cells, and a 10.28% friability. The resulting foam also was at 104.0% of its original dimensions after seven days at 158° F. and 100% relative humidity, and was at 101.6% of its original dimensions after seven days at 200° F. and the ambient relative humidity. The "B" side, when placed in a closed container, remained a homogeneous liquid when left to stand without agitation for seven days.

What is claimed is:

1. A method for the manufacture of polyisocyanurate foams, comprising blending a "B" side with an "A" side, said "A" side comprising an isocyanate and said "B" side comprising a diol, an amine/quaternary ammonium borate ester blend, a surfactant, a blowing agent, and a metal catalyst, the weight of said metal catalyst not to exceed 1.0% of the total weight of said "B" side, and wherein said foams have a friability not exceeding 30%.

2. The method as set forth in claim 1, wherein said diol may be selected from the group consisting of diethylene glycol, dipropylene glycol, and a polyethylene glycol ether.

3. The method as set forth in claim 1, wherein the ratio of amine to quaternary ammonium borate ester in said amine/quaternary ammonium borate ester blend is between 1:0.15 and 1:0.90.

4. The method as set forth in claim 2, wherein the ratio of amine to quaternary ammonium borate ester in said amine/quaternary borate ester blend is between 1:0.15 and 1:0.90.

5. The method as set forth in claim 1, wherein said isocyanate is a polymeric methylene diphenyldiisocyanate.

6. The method as set forth in claim 2, wherein said isocyanate is a polymeric methylene diphenyldiisocyanate.

7. The method as set forth in claim 4, wherein said isocyanate is a polymeric methylene diphenyldiisocyanate.

* * * * *